C. TÖNJES.
ADJUSTING DEVICE FOR TURNABLE PARTS.
APPLICATION FILED APR. 18, 1911.
1,015,854.
Patented Jan. 30, 1912.
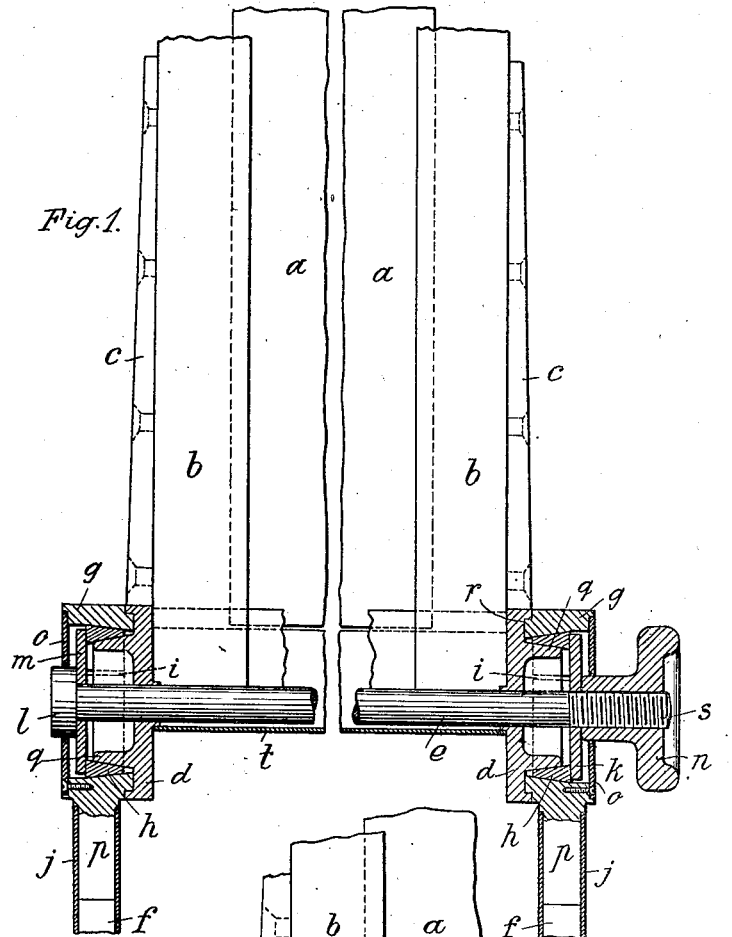
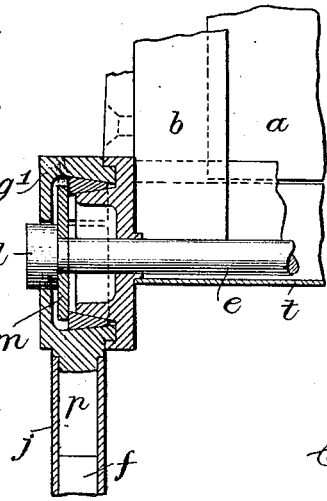

UNITED STATES PATENT OFFICE.

CARL TÖNJES, OF DELMENHORST, GERMANY.

ADJUSTING DEVICE FOR TURNABLE PARTS.

1,015,854.

Specification of Letters Patent. Patented Jan. 30, 1912.

Application filed April 18, 1911. Serial No. 621,814.

*To all whom it may concern:*

Be it known that I, CARL TÖNJES, a citizen of the Empire of Germany, residing at Delmenhorst, in the Empire of Germany, have invented a new and useful Adjusting Device for Turnable Parts, of which the following is a specification.

My invention consists of an adjusting device for turnable parts, which device permits the part to be easily adjusted in any position, also to be easily released and turned into any other position, after which it can easily be again secured.

I will now proceed to describe my invention with reference to the accompanying drawings, in which—

Figure 1 is an elevation of an adjusting device and a turnable part assumed to be a part of a protecting window such as is used in ordinary automobiles, parts being shown in section and an intermediate part being omitted, and Fig. 2 shows a modification of the left part in Fig. 1.

Similar letters of reference refer to similar parts throughout the several views.

In order to illustrate the use of my invention I have shown in Fig. 1 a protecting window in front of the driver of any ordinary automobile, which window requires to be either placed vertically or adjusted at an angle convenient to the driver. This window consists of a glass plate $a$ and a wooden frame $b$ and requires to be rocked on a horizontal shaft $e$. For this purpose two metallic plates $c\ c$ are fastened on the sides of the frame $b$ and are made in one with two opposite disks $d\ d$ turnable on the shaft $e$. Two supports $f\ f$ secured on the automobile body are shown to be connected with two bearings $g\ g$ by means of tubes $j\ j$ and projections $p\ p$ but they may also be made in one with the bearings. The disks $d\ d$ are each provided with a friction cone $q$ and a concentric groove $r$, in which a corresponding projection of the bearing $g$ engages, so that in this manner the disk $d$ is prevented from lateral displacement. The two bearings $g\ g$ are on the inside partly cylindrical and partly conical and their conical parts form friction cones, so that annular spaces of a wedge-shaped cross section are left between them and the friction cones $q\ q$ on the disks $d\ d$. In these annular spaces engage two corresponding wedges $h\ h$ which project from the inner friction cones $q\ q$ and are adapted to be pressed toward the windows by two annular disks $k$ and $m$ turnable on the shaft $e$. Preferably the wedges $h\ h$ are each divided into several portions, between which radial slots $i\ i$ are left. The shaft $e$ is preferably provided at one end with a head $l$ and at the other end with a screw-thread $s$, in which a small hand-wheel $n$ engages. The shaft $e$ may be prevented from turning in any known manner. The head $l$ is adapted to bear against the disk $m$ and the hand-wheel $n$ against the other disk $k$. It will be seen that each bearing $g$ forms with the corresponding disk $d$ a friction clutch. In order to protect this clutch from dust or dirt a disk $o$ is preferably provided, which is fastened on the bearing $g$ and is made to compass the head $l$ or the nave of the hand-wheel $n$ respectively in such a manner, that the shaft $e$ and the hand-wheel $n$ are not prevented from endwise motion.

$t$ denotes a sort of hood, which incloses the shaft $e$ and is fastened on both sides of the lower stile of the frame $b$. It equally serves for protecting the two friction clutches from dust and dirt. After a little loosening the hand-wheel $n$ the two friction clutches described permit the window to be turned in either direction without incurring any danger that the window when released will tilt over and be damaged by striking the body or other part of the automobile. After adjusting the window, it can be secured in the new position by screwing home the hand-wheel $n$. When desired, the hand-wheel $n$ may be again loosened for turning the window into any other position, after which it can be again secured. This is a great advantage over the ordinary turnable protecting windows in automobiles, which windows are very apt to tilt over on being disconnected from the supporting frame. The ordinary protecting windows can moreover be adjusted only in any of several determined positions, since either toothed rings are employed, in which a spring pressed bolt or the like engages, so that the window can be turned only through an angle corresponding to at least one tooth pitch, or notched segments are employed, which permit only four or five different positions of the window. My device, on the contrary, renders it possible to adjust the protecting window in any position.

The adjusting device may be simplified in a manner illustrated at Fig. 2, in which the protecting disk $o$ is made in one with the bearing $g'$, so that the pressing disk $m$ (or $k$) requires to be slightly smaller in diameter for permitting of its introduction.

The adjustable device for turnable parts can be varied in many respects without departing from the spirit of my invention.

I claim:

A device of the character described comprising a pair of fixed bearings having coniform bores, a pair of apertured disks engaging the inner sides of the bearings and having tapering circular flanges that diverge from the walls of the bearing-bores, a pair of oppositely movable wedge-shaped friction rings interposed between the bearings and disk flanges, a spindle received by the disk-apertures, means on one end of said spindle for operatively engaging one of said rings, and a nut threaded on the other end of said spindle and adjustably engaging the other ring.

In witness whereof I have hereunto signed my name in the presence of two subscribing witnesses.

CARL TÖNJES.

Witnesses:
MARTIN FISCHER,
FREDERICK HOYERMANN.